Patented Aug. 3, 1948

2,446,257

UNITED STATES PATENT OFFICE 2,446,257

ESTER-ACETALS OF POLYPENTA-ERYTHRITOLS

Robert H. Barth, Ridgewood, N. J., assignor to Heyden Chemical Corporation, New York, N. Y., a corporation of Delaware No Drawing. Application March 8, 1944, Serial No. 525,592

5 Claims. (Cl. 260—338)

This application is a continuation in part of the prior and copending applications, of Harry Burrell and Robert H. Barth, Serial No. 378,052, filed Feb. 8, 1941, which issued as Patent No. 2,356,745, and Serial No. 447,782, filed June 20, 1942.

This invention relates to ester-acetals of pentaerythritol and polypentaerythritols in which one or more of the original hydroxyl groups of the alcohols has been reacted with an acid, and two or more of the other original hydroxyl groups have been reacted in pairs with an aldehyde. The acid may be a long-chain or short-chain aliphatic acid, or may be any one of a wide variety of other acids, including abietic. The aldehyde may be formaldehyde, acetaldehyde, butyraldehyde, and a wide variety of others, including benzaldehyde. The esters may contain one or more free hydroxyl groups.

One object of the invention is to prepare compounds which are useful as intermediates, plasticizers, and for various other purposes.

It is a further object of the invention to prepare substances compatible with a wide variety of resins and cellulose derivatives, and which serve to plasticize, soften, elasticize, lubricate, and otherwise modify these plastics. The resulting compositions may be molded under pressure, dissolved in solvents to form coating compositions, extruded to form ribbons, fibers, or structural shapes, emulsified or otherwise prepared to be used as textile assistants, and so forth.

The ester-acetals of this invention may be used with cellulose nitrate, cellulose acetate, cellulose acetobutyrate and other cellulose esters, ethyl cellulose, methyl cellulose, benzyl cellulose and other cellulose ethers, dammar, manila, rosin, ester gum, and other natural resins, polystyrene, polyvinyl esters and acetals, chlorinated rubber, phenol-formaldehyde, urea-formaldehyde, melamine-formaldehyde, and other synthetic resins, castor oil, triacetin, tricresyl phosphate, dibutyl phthalate and other plasticizers, if necessary, and with or without such solvents, pigments or fillers as may be desirable.

The plasticizers may be incorporated with these ingredients according to methods well known in the art, as for example by dissolving in a mutual solvent and subsequently evaporating the solvent, by kneading at an elevated temperature, if desired, and conveniently in a machine of the Banbury mixer type, by milling on differential rolls, and so forth.

In the manufacture of pentaerythritol by the condensation of acetaldehyde and formaldehyde, in addition to the pentaerythritol itself, smaller amounts of related hydroxylated substances are also obtained. One of these, which is obtained in a considerable amount, is dipentaerythritol, which is an ether having the following structure:

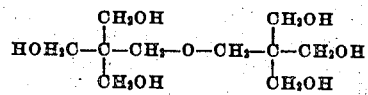

(See Brün. "Ueber den Dipentaerythrit," Wilhelm Greven, Krefeld, 1930.) Another related hydroxylated substance, which is obtained in somewhat smaller amounts, is white and crystalline, melts at 230 to 240° C., and has a hydroxyl content of 33%. It contains 46.5 per cent carbon and 9.15 per cent hydrogen; the remainder may be presumed to be oxygen. It is related to dipentaerythritol in that it contains pentaerythritol residues bound by ether linkages. Regardless of chemical structure, for purposes of definition in this specification and in the claims, this substance will be termed "pleopentaerythritol." According to the best evidence available, pleopentaerythritol is probably a mixture of dipentaerythritol, tripentaerythritol, and possibly additional related alcohols.

Dipentaerythritol, tripentaerythritol, and pleopentaerythritol may be grouped together under the generic term "polypentaerythritols," by which term is meant those compounds having higher molecular weights than pentaerythritol which are formed either actually or theoretically by etherifying one or more of the hydroxyl groups of pentaerythritol with other pentaerythritol residues.

Among the acids suitable for esteryifying pentaerythritol and polypentaerythritols may be mentioned saturated and unsaturated acids, such as acetic, propionic, butyric, lauric, stearic and other straight or branched-chain fatty acids, isobutyric, valeric, phenylacetic, 2-ethylhexoic, levulinic and other carboxylic acids, including abietic.

The partial esters or hydroxy esters claimed in the aforesaid application Serial No. 447,782 are useful starting materials for the production of the aldehyde compounds of the present invention. Some or all of the unesterified hydroxyl groups of such partial esters may be reacted with aldehydes to form cyclic acetals, which linkages influence the compatibility and behavior of the resulting molecules.

The partial esters of pentaerythritol or polypentaerythritols with higher fatty acids are easily prepared by heating together stoichiometric amounts of the acid and the polyhydric alcohol.

The temperature may be conveniently in the range of 180° C. to approximately 300° C., or somewhat higher. The reaction may be advantageously carried out with the use of constant agitation, and in certain cases with the use of an inert atmosphere. Catalysts may be added, if desired, such as sulphuric acid, p-toluene sulfonic acid, or preferably those catalysts disclosed in copending application Serial No. 433,942, filed March 9, 1942, by Harry Burrell, which has issued as Patent No. 2,360,394, such catalysts being soluble compounds of calcium, strontium, barium, zinc and cadmium. In the preparation of the mono esters of pentaerythritol, care should be exercised not to overheat the pentaerythritol before the esterification has occurred; such overheating results in decomposition of the pentaerythritol with the formation of colored products and undesirable by-products.

The partial or hydroxy esters of pentaerythritol and lower molecular weight fatty acids may also be prepared in most cases by heating pentaerythritol with limited amounts of the acid or its equivalent. A more convenient way, however, is to prepare the wholly esterified derivatives of pentaerythritol and the acid then to alcoholize the resulting ester with pentaerythritol or a polypentaerythritol. This is illustrated in Preparation 2 hereinafter.

The following examples are intended as illustrative only, and should not be so construed as to limit the invention as to scope or proportions. Parts are by weight.

PREPARATION 1.—PARTIAL ESTERS BY DIRECT ESTERIFICATIONS

For making the partial esters, a charge of pentaerythritol or a polypentaerythritol was heated with a molecularly equivalent quantity of the fatty acid at a temperature of 240 to 250° C. for 1 to 2 hours, until one molecular equivalent of water was evolved, or until the acid number reached a value of less than 5. In some cases, certain technical fatty acids, which were mixtures, were used. In these, the apparent molecular equivalent obtained by direct titration was employed. An atmosphere of carbon dioxide was maintained during the esterification. This process is suitable for the esterification of fatty acids having higher molecular weights than oenanthylic, the normal heptoic acid. The acids may be saturated, or unsaturated, with or without hydroxy groups, and having normal or branched chains, provided they boil in the range of 230 to 240° C. or higher. Specific compounds prepared by this method are listed below in Table I.

Table I

| Compound | Parts by weight of acid used | Parts by weight of hydroxy compound used | Physical State |
|---|---|---|---|
| Pentaerythritol Monostearate | 284 | 136 | Solid. |
| Pentaerythritol Monomyristate | 235 | 136 | Do. |
| Pentaerythritol Monolaurate | 204 | 136 | Do. |
| Pentaerythritol Monocastor oil fatty acid ester | 322 | 136 | Oil. |
| Pentaerythritol Monosoybean fatty acid ester | 272.5 | 136 | Do. |
| Pentaerythritol Monocaprate | 175 | 136 | Do. |
| Pentaerythritol Monocaprylate | 149 | 136 | Do. |
| Pentaerythritol Monooleate | 496 | 240 | Do. |
| Dipentaerythritol Monolaurate | 102 | 127 | Solid. |
| Dipentaerythritol Distearate | 284 | 125 | Do. |

PREPARATION 2.—PARTIAL ESTERS BY ALCOHOLYSIS

When a mixture of pentaerythritol and a pentaerythritol tetraester is heated in the presence of an alkaline catalyst such as anhydrous potassium carbonate, an alcoholysis of the ester occurs. Thus, when one molecular equivalent of pentaerythritol and one molecular equivalent of pentaerythritol tetraacetate, M. P. 82°, were heated with a small amount (for instance 0.1%) of potassium carbonate at 150° C. for 2 to 4 hours, new products were formed which contained both hydroxyl and acetate groups. When this material was vacuum distilled at a pressure of 2 mm., pentaerythritol diacetate, B. P. 207–215° C., was obtained as the major product. Similarly, if one mol of pentaerythritol and three mols of the tetraacetate are heated with the catalyst and distilled under a pressure of 2 mm., a new monohydroxy triacetate compound of pentaerythritol is formed, B. P. 176–182° C. Similarly, there have been made partially esterified acetates of dipentaerythritol and propionates of pentaerythritol. Some of these can be distilled, while others are too high boiling. The monoacetate of pentaerythritol has not been distilled, although it has been made by this process.

Other partial esters which may be used as starting materials may be made as follows:

PREPARATION 3.—PENTAERYTHRITOL DIABIETATE

| | Parts |
|---|---|
| Rosin | 345 |
| Technical pentaerythritol ("Pentek" which contained approximately 85% monopentaerythritol and 15% dipentaerythritol) | 71.4 |
| Petroleum fraction solvent | 40 |

The foregoing ingredients were all placed in a reacting vessel equipped with a thermometer, stirrer, and outlet tube. To the outlet tube was connected a condenser and a trap which would collect the water formed and return the petroleum solvent to the reaction vessel. When the rosin became melted the agitation was started and the temperature was rapidly raised to 270° C. over a period of 1 hour. The temperature was held at this point for about 2 hours, after which time the petroleum solvent was removed from the reaction mixture. The product, which was a technical pentaerythritol diabietate, was a light brown, transparent, resinous solid.

PREPARATION 4.—DIPENTAERYTHRITOL TRIESTER OF LINSEED OIL FATTY ACIDS

| | Parts |
|---|---|
| Linseed oil fatty acid | 284 |
| Dipentaerythritol (technical) | 85 |
| Petroleum solvent | 40 |

The foregoing ingredients were all added to a reaction vessel equipped with a thermometer, stirrer and distillation trap. The temperature was gradually raised to 300° C. over a period of 2 hours, and held at 300° C. for 30 minutes. The product was a somewhat viscous oil consisting essentially of the triester of dipentaerythritol and linseed oil acids.

PREPARATION 5.—PENTAERYTHRITOL MONOPALMITATE

| | Parts |
|---|---|
| Palmitic acid | 200 |
| Technical pentaerythritol | 55.9 |

The two ingredients were placed together in a reaction flask equipped with a thermometer and agitators. The temperature of the mixture was gradually raised, and at 185° C. the reaction began, as was evidenced by liberation of water. The elevation of the temperature was continued until 250° C. was reached, at which temperature the reaction mixture was maintained until evolution of water vapor ceased. On cooling, the product solidified to a hard, white, waxy solid, consisting essentially of pentaerythritol monopalmitate.

PREPARATION 6.—PENTAERYTHRITOL TRISTEARATE

Technical pentaerythritol tristearate was prepared by heating together in an inert atmosphere with constant stirring.

| | Parts |
|---|---|
| Stearic acid | 2,000 |
| Technical pentaerythritol | 336 |
| Calcium stearate (as a catalyst) | 20 |

The temperature was gradually raised over a period of 2½ hours to 250° C., at which temperature it was held for 4 hours. The product was a hard, white, waxy solid.

PREPARATION 7.—DIPENTAERYTHRITOL TETRASTEARATE

Dipentaerythritol tetrastearate was prepared by heating together.

| | Parts |
|---|---|
| Stearic acid | 2,000 |
| Dipentaerythritol | 472 |
| Calcium stearate | 20 | according to the same heating schedule as in Preparation 6. The product was very similar in appearance to that obtained in Preparation 6.

EXAMPLE 1.—PREPARATION OF ESTER-ACETALS

The mono and diesters when heated with an equimolecular quantity of an aldehyde yield ester cyclic acetals by elimination of one molecular equivalent of water. These are best made by heating the reactants in the presence of toluene or xylene to remove the evolved water. The reaction is catalyzed by addition of sulphuric acid in amounts of 1/10 to ½% of the total weight of reactants. Examples of the compounds made by this process are: pentaerythritol monostearate benzal, pentaerythritol monoacetate formal, pentaerythritol diacetate formal, and dipentaerythritol monoacetate formal.

Such compounds are of value for various purposes. For instance, pentaerythritol monostearate benzal is compatible with cellulose nitrate, cellulose acetate-butyrate, and ethyl cellulose, as well as with chlorinated rubber. It has a plasticizing action in films prepared from its mixtures with the above-listed film-formers.

EXAMPLE 2.—DIPENTAERYTHRITOL DISTEARATE DIBENZAL

A mixture of 127 parts of dipentaerythritol, 106 parts of benzaldehyde, 50 parts of toluene, and 2 parts of 35% hydrochloric acid was heated with stirring at the boiling point until it was a homogeneous solution. Water of reaction was removed by use of a trap under the reflux condenser to separate the toluene-water azeotrope. After 22 parts of water were removed, 284 parts of stearic acid were added together with 2 more parts of 35% hydrochloric acid. Water of reaction was removed again as above, and then the toluene and hydrochloric acid were removed by distillation under vacuum. The melted residue was treated with activated charcoal, filtered and, upon cooling, formed a hard wax soluble in aromatic hydrocarbons.

EXAMPLE 3.—DIPENTAERYTHRITOL DISTEARATE DIFORMAL

A mixture of 127 parts of dipentaerythritol, 100 parts of 30% formaldehyde solution and 2 parts of 35% hydrochloric acid was heated to boiling until it was a homogeneous solution. To this were added 284 parts of stearic acid and 50 parts of toluene. The water originally present together with that formed in both the acetal and esterification reactions was removed by separating the toluene-water azeotrope by means of a trap under the reflux condenser designed to return the toluene. The toluene was removed by distillation under vacuum and the melted wax was decolorized with 35 parts of activated charcoal. Upon cooling, a hard wax that was soluble in aromatic hydrocarbons was obtained.

EXAMPLE 4.—PENTAERYTHRITOL DISTEARATE MONOBENZAL

A mixture of 177.7 parts of the distearate of technical pentaerythritol, 26.5 parts of benzaldehyde, 100 parts of xylene and 2 parts of 35% hydrochloric acid was heated to reflux and the reaction water was removed as described in Example 2. Upon removal of the xylene by distillation under vacuum, a hard wax was obtained.

EXAMPLE 5.—PENTAERYTHRITOL DIACETATE MONOBUTYRAL

A mixture of 154 parts of technical pentaerythritol, 158 parts of butyraldehyde, 0.5 part of 35% hydrochloric acid and 223 parts of acetic anhydride was heated for 30 minutes to obtain a homogeneous solution. The liberated water and acetic acid were removed by distillation under vacuum and an oily liquid was obtained.

EXAMPLE 6.—DIPENTAERYTHRITOL DIACETATE DIBUTYRAL

A mixture of 158.4 parts of technical dipentaerythritol, 144 parts of butyraldehyde, 204 parts of acetic anhydride, and 1 part of 35% hydrochloric acid was reacted as in Example 5. An oily liquid was obtained as in Example 5.

EXAMPLE 7.—PENTAERYTHRITOL DIACETATE MONOBUTYRAL

A mixture of 154 parts of technical pentaerythritol, 158 parts of butyraldehyde, and 4 parts of concentrated hydrochloric acid was heated to boiling for 30 minutes. The water formed by the acetal reaction was removed by distillation under vacuum. To this butyral were added 38 parts of acetic anhydride, and this mixture was heated for one hour. The liberated acetic acid was removed by distillation under reduced pressure and an oily liquid remained.

EXAMPLE 8.—DIPENTAERYTHRITOL DIACETATE DIBUTYRAL

In a similar way to that described in Example 7, the dibutyral of dipentaerythritol was first prepared and subsequently acetylated, and an oily liquid was obtained. The proportions used were 158.4 parts of technical dipentaerythritol, 158 parts of butyraldehyde, 4 parts of concentrated hydrochloric acid, and 204 parts of acetic anhydride.

EXAMPLE 9.—PENTAERYTHRITOL DIACETATE MONOFORMAL

Crude pentaerythritol monoformal was prepared by heating 136 parts of pentaerythritol with 100 parts of 30% formaldehyde solution and 2 parts of concentrated hydrochloric acid. The water was removed by distillation under vacuum after the acid had been neutralized with ammonia. Eight (8) parts of this crude formal were reacted with 25 parts of acetic anhydride. When acetylation was completed, the excess anhydride and the liberated acetic acid were removed by distillation under reduced pressure. The residue was distilled at a pressure of 0.6 mm. of mercury, and it boiled at 110 to 111° C. It was pure pentaerythritol diacetate monoformal.

EXAMPLE 10.—PENTAERYTHRITOL DIABIETATE MONOBUTYRAL

A mixture of 2,000 parts of rosin and 417 parts of technical pentaerythritol was heated for 2 hours at 280° C. under an atmosphere of carbon dioxide. This was cooled to about 80° C., and 236 parts of butyraldehyde were slowly added. During the slow addition of the aldehyde, concentrated hydrochloric acid was added dropwise until 55 parts had been used. Then 250 parts of toluene were added and the mixture refluxed, while the water of reaction was removed azeotropically as described in Example 2. The toluene was removed by distillation under vacuum and a heavy oil remained, which solidified into a hard, brown, glassy substance.

EXAMPLE 11.—PENTAERYTHRITOL DIABIETATE MONOBUTYRAL

A mixture of 900 parts of diabietate of pentaerythritol, technical, and 90 parts of butyraldehyde was heated to 105° C. Then 1.5 parts of oxalic acid were added and the mixture heated at about 100° C. for 2 hours. Most of the water formed in the reaction was removed during this period. To this were added 100 parts of toluene and the mixture was distilled in an effort to remove all of the water. After about 5 hours of heating, during which time the temperature rose from 100° C. to 150° C., the toluene was removed together with the remaining water. The resulting product was substantially identical with that formed in Example 11.

Reference is made to application Serial No. 563,310, filed November 13, 1944, wherein is claimed matter that is disclosed but not claimed herein.

Having thus described my invention what I claim as new and desire to secure by Letters Patent is:

1. A compound consisting of an ester-acetal of a polypentaerythritol in which at least two but not all of the original hydroxyl groups of the polypentaerythritol have been acetalized in pairs by an aldehyde selected from the group consisting of formaldehyde, acetaldehyde and butyraldehyde and at least one of the remaining hydroxyl groups has been esterified by an aliphatic carboxylic acid.

2. A compound consisting of an ester-acetal of dipentaerythritol in which at least two but not all of the original hydroxyl groups of the dipentaerythritol have been acetalized in pairs by an aldehyde selected from the group consisting of formaldehyde, acetaldehyde and butyraldehyde and at least one of the remaining hydroxyl groups has been esterified by an aliphatic carboxylic acid.

3. An ester-acetal of dipentaerythritol in which two of the original hydroxyl groups of the dipentaerythritol have been esterified by an aliphatic carboxylic acid and the remaining four original hydroxyl groups have been acetalized by an aliphatic aldehyde selected from the group consisting of formaldehyde, acetaldehyde and butyraldehyde.

4. Dipentaerythritol diacetate dibutyral, which is an ester-acetal of dipentaerythritol in which two of the original hydroxyl groups of dipentaerythritol have been esterified by acetic acid and the remaining four original hydroxyl groups have been acetalized by butyraldehyde.

5. Dipentaerythritol distearate diformal, which is an ester-acetal of dipentaerythritol in which two of the original hydroxyl groups of dipentaerythritol have been esterified by stearic acid and the remaining four original hydroxyl groups have been acetalized by formaldehyde.

ROBERT H. BARTH.

REFERENCES CITED

The following references are of record in the file of this patent:

UNITED STATES PATENTS

| Number | Name | Date |
|---|---|---|
| 2,223,421 | Hubacher et al. | Dec. 3, 1940 |
| 2,348,708 | Bradley | May 16, 1944 |

OTHER REFERENCES

Skrable et al.: Berichte 61B (1927), pp. 55 to 57.

Boeseken et al.: Berichte 61B (1928), pp. 787–89.

Orthner et al.: Annalen 484 (1930), pp. 131–54.

Chemical Abstracts (1931), vol. 21, pp. 1486–87.